United States Patent [19]

Rudolph et al.

[11] 3,862,971

[45] Jan. 28, 1975

[54] PROCESS FOR MAKING PERFLUOROCARBOXYLIC ACIDS AND FLUORIDES THEREOF

[75] Inventors: Werner Rudolph, Anderten; Joachim Massonne, Hannover; Karl-Heinz Fazniewscy, Lehrte, all of Germany

[73] Assignee: Kali-Chemie Aktiengesellschaft, Hannover, Germany

[22] Filed: Feb. 2, 1973

[21] Appl. No.: 329,188

[30] Foreign Application Priority Data
Feb. 16, 1972 Germany............................ 2207177

[52] U.S. Cl. .......... 260/408, 260/539 R, 260/544 F
[51] Int. Cl.... C07c 51/58, C07c 53/34, C07c 53/36
[58] Field of Search ............ 260/408, 539 R, 544 F

[56] References Cited
UNITED STATES PATENTS
3,102,139  8/1963  Lawlor et al........................ 260/546
3,351,644  11/1967  Hauptschein et al............... 260/408

OTHER PUBLICATIONS
Kim, J. Org. Chem. vol. 32, no. 11, pp. 3673–5, Nov., 1967.

*Primary Examiner*—Lewis Gotts
*Assistant Examiner*—Diana G. Rivers
*Attorney, Agent, or Firm*—Michael S. Striker

[57] ABSTRACT

Perfluorinated carboxylic acids and their fluorides of the formula

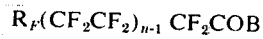

wherein $R_F$ is a perfluoroalkyl radical, B is OH or F, and n is an integer from 1 to 7 are made by reacting a fluoroalkyl iodide of the formula

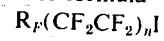

at a temperature of 50° to 120°C with oleum in the presence of a salt of a metal of Group IIB of the Periodic Table while adding chlorine, the molar ratio of $SO_3$ to perfluoroalkyl iodide being between 2.5 : 1 and 10 : 1. This is followed by isolating the formed perfluorocarboxylic acid fluoride or by hydrolyzing the fluoride to the corresponding perfluorocarboxylic acid.

10 Claims, No Drawings

PROCESS FOR MAKING PERFLUOROCARBOXYLIC ACIDS AND FLUORIDES THEREOF

BACKGROUND OF THE INVENTION

Perfluorocarboxylic acids and perfluorocarboxylic acid fluorides of intermediate chain length for instance of 6 to 12 carbon atoms represent valuable intermediates for making surface active compounds which can be used as oleophobizing, hydrophobizing or soil release agents.

According to U.S. Pat. No. 2,519,983 perfluorocarboxylic acids and fluorides thereof with more than 3 carbon atoms are for instance obtained by an electrochemical fluorination of the corresponding hydrocarbons with liquid hydrogen fluoride. This process is relatively costly because of low yields of perfluorinated fatty acids and large amounts of undesirable by-products particularly where perfluorocarboxylic acids are to be made of a somewhat longer chain length.

German published application No. 1,618,031 proposes therefore to make perfluorinated carboxylic acid fluorides by reaction of perfluoroalkyl iodides with sulfur trioxide while using $SbF_5$ and/or $SbF_3Cl_2$ as catalyst one of the difficulties with this process is that it requires the use of stabilized $SO_3$. The stabilizer has an undesirable effect on the reaction or pure $SO_3$ must be recovered immediately prior to the reaction from the oleum. In addition the reaction involves comparatively long reaction times and in general unsatisfactory yields of carboxylic acid fluorides are obtained.

In the German published application 1,211,619 the proposal was further made to carry out the making of the perfluorinated carboxylic acids or their fluorides by use of oleum. In this case reaction temperatures are necessary in the range between about 120° and 160°C. The reaction must therefore be performed in a pressure apparatus. It is furthermore undesirable that because of the long reaction time, poor space-time relations in regard to the yield result.

SUMMARY OF THE INVENTION

The invention resides in a reaction where a perfluoroalkyl iodide of the general formula

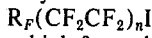

in which formula $R_F$ is a perfluoroalkyl radical and $n$ is an integer from 1 to 7; is reacted with oleum at a temperature between 50° and 120°C in the presence of salts of metals of group IIB of the Periodic Table and upon addition of chlorine. The amount of oleum must be such that the mol ratio of free $SO_3$ to perfluoroalkyl iodide is between 2.5:1 and 10:1. There are thus obtained perfluorocarboxylic acid fluorides which may be isolated as such or may be hydrolyzed to the corresponding perfluorocarboxylic acids.

DETAILS OF THE INVENTION AND SPECIFIC EMBODIMENTS

The perfluoroalkyl groups in the starting products which are indicated in the above formula by the designation $R_F$ are preferably lower perfluoroalkyl groups such as a perfluoromethyl, perfluoroethyl, perfluoropropyl or perfluoroisopropyl group. The suffix n in the formula of the starting product and of the final product preferably is an integer between 1 and 7.

It is however noted that the practicality of the process of the invention does not depend upon the chain length of the perfluoroalkyl iodides used as starting materials. The perfluoroalkyl iodides themselves can be made in various manners. It is preferred to obtain them by telomerization of perfluoroalkyl iodides of a lower molecular weight with tetrafluoroethylene in the presence of catalysts. There are thus usually obtained mixtures of perfluoroalkyl iodide telomers of varying chain length and molecular weight. These perfluoroalkyl iodide mixtures can also be used as such as starting products in the process of the invention.

As catalysts in the inventive process there may be used for instance salts of mono- or bivalent mercury, particularly $Hg_2SO_4$ and $HgSO_4$ and mixtures thereof. Particularly good results are obtained by use of zinc sulfate as catalyst but for instance cadmium salts also are useful in the reaction. Likewise the corresponding metal halides or metal nitrates may be used.

The amount of the metal catalyst preferably is in the range of 0.1 to 5 percent by weight relative to the amount of the initial perfluoroalkyl iodide. Usually the entire amount of catalyst is added right at the beginning of the reaction.

The concentration of free sulfur trioxide ($SO_3$) in the fuming sulfuric acid can be selected as desired. It should generally not be too low. To obtain good results the mol ratio of free $SO_3$ to perfluoroalkyl iodide should be between 2.5:1 and 10:1, preferably between 3:1 and 8:1.

Important for a rapid and quantitative development of the reaction is the addition of elemental chlorine. The amount of chlorine which is used for the reaction can be varied within a broad range. Useful results are obtained if 5 to 25 percent by weight of chlorine, relative to the initial amount of the iodide used as starting product, are introduced during the course of the reaction.

The reaction can be performed at atmospheric pressure at temperatures between 50° and 120°C, preferably at temperatures of 60° to 100°C. The reaction time essentially depends on the type of reaction components and is between about 2 and 8 hours.

The mixture obtained in the process of the invention can then be further treated in various manners. At completion of the reaction the mixture separates into two phases. The organic phase contains nearly all of the carboxylic acid fluoride which can be recovered therefrom by distillation. The inorganic phase consists of an iodine-sulfuric acid mixture and can again be used in the reaction after replenishing the used-up sulfur trioxide.

The perfluorocarboxylic acids can be recovered by subjecting the organic phase to hydrolysis with ice water and extracting it with ethyl ether. The perfluorocarboxylic acids can then be recovered by distillation after removal of the ether.

In a preferred embodiment the reuse of the inorganic phase in the reaction is omitted and instead the valuable iodine is recovered from the product of the reaction.

If it is desired to isolate the perfluorocarboxylic acid fluorides by separation of the phases it is preferred to hydrolyze the inorganic phase with ice, to extract the iodine with benzene from the mixture obtained in the hydrolysis, to treat the iodine-containing benzene solution with aqueous alkali and finally to separate the iodine which is obtained after acidifying of the mass with sulfuric acid.

Iodine and perfluorocarboxylic acids can be obtained in the reaction at a high degree of purity if the entire reaction mixture is subjected to hydrolysis, the iodine is extracted with benzene, the perfluorinated fatty acids after separation of the organic phase are extracted from the aqueous phase with ethyl ether and the perfluorocarboxylic acids are finally recovered by distillation. The iodine in this case can be obtained as indicated above. This type of approach is possible because benzene at low temperatures has a good solubility for iodine but only a poor solubility for perfluorinated fatty acids.

The process of the invention has the advantage that the reaction in the presence of the catalysts of the invention and upon addition of chlorine takes place at a rapid rate and without formation of byproducts. The conversion to perfluoroalkyl iodides is therefore on a quantitative scale and the yield of perfluorocarboxylic acid fluorides or perfluorocarboxylic acids is high. It is further an advantage with this process that it does not require any expensive apparatus. Besides the combined benzene-ether extraction of the reaction mixture permits simultaneously to obtain perfluorocarboxylic acids and iodine at a high degree of purity. The solvents used in the reaction can be separated and reused for another extraction.

The following examples will further illustrate the invention.

EXAMPLE 1

183 g (0.335 mol) of perfluorooctyl iodide and 2 g of zinc sulfate were placed in a 500 ml three-neck flask provided with a stirrer and reflux condenser and gas inlet tube. The contents of the flask were then heated to 90°C and 370 g of 65 percent oleum were added dropwise, the oleum containing 65 percent by weight of free $SO_3$. The molecular ratio of free $SO_3$ to perfluorooctyl iodide was accordingly approximately 9:1. Simultaneously chlorine was passed into the mixture at a rate of 2 Nl/h. After 4 hours the addition of oleum was complete. The mixture was then permitted to further react for another 4 hours while additional chlorine was added. The temperature of the reaction decreased in the course of the reaction to 70°C. After cooling the mixture the organic phase was separated from the inorganic phase.

The organic phase was then hydrolyzed with ice-water and the mixture thus obtained was subjected to three extractions with ethyl ether. After distilling off the ether the obtained crude product was distilled in a vacuum. There were thus obtained 127 g (0.306 mol) of perfluoroheptanoic acid, that is, 91.5 percent of the theoretical amount. No traces of the starting product could be found in the final product.

To recover the iodine the inorganic phase which substantially consisted of oleum was then hydrolyzed with ice while stirring. After completion of the hydrolysis the iodine was subjected to several extractions with benzene. The iodine-containing benzene solution was further reacted with aqueous NaOH until it had become discolored. The aqueous phase was then separated from the benzene, acidified with $H_2SO_4$ and the residual iodine was liberated by introducing $Cl_2$ into the aqueous solution. Altogether 45 g, that is 95.6 percent of the theoretical value, were thus recovered.

EXAMPLE 2

200 g of a mixture of perfluoroalkyl iodides of a chain length of 6 to 12 carbon atoms (mean molecular weight 546) and 2 g of $ZnSO_4$ were placed in a 500 ml three-neck flask provided with a stirrer and reflux condenser. During a period of 8 hours 370 g of a 65 percent oleum were added dropwise and 16 l of chlorine were introduced. The molecular ratio of free $SO_3$ to perfluoroalkyl iodide was approximately 8.2:1. The initial reaction temperature was 115°C; it decreased in the course of the addition of oleum to 85°C. After completion of the reaction the cold mixture was decomposed with ice-water followed by extraction of the iodine with benzene.

After separating the benzene layer, the aqueous solution containing the entire contents of perfluorocarboxylic acids was subjected to extraction with ethyl ether. All of the perfluorocarboxylic acids therefore were now in the ether extract.

After distilling off the ether the obtained crude product (in an amount of 145 g) was subjected to vacuum distillation. There were thus obtained 121 g of perfluorocarboxylic acids with a mean molecular weight of 414. No traces of perfluoroalkyl iodides could be found in the final product.

The iodine-containing benzene was then reacted with dilute aqueous NaOH until it lost color. The separated alkaline layer was acidified with $H_2SO_4$. The iodine was finally liberated by introduction of $Cl_2$ and separated. The yield of iodine was 41 g.

EXAMPLE 3

200 g of a mixture of perfluoroalkyl iodides of a chain length of 6 to 12 carbon atoms and 2 g of a $Hg_2SO_4/HgSO_4$ mixture as catalyst were placed in a 500 ml three-neck flask provided with a stirrer and upstanding reflux condenser. 370 g of oleum containing 65 percent by weight of free $SO_3$ were then added dropwise during a period of 8 hours. The molecular ratio of free $SO_3$ to perfluoroalkyl iodide was approximately 8.2:1. Chlorine was at the same time introduced into the mass at a speed of 2 l/h. The initial temperature of the reaction was 95°C. The temperature slowly decreased to 75°C. After cooling the mixture the inorganic phase was separated from the organic phase. The organic phase (109 g) was subjected to distillation. There were obtained 92 g (60 percent) of a mixture of perfluorocarboxylic acid fluoride of a boiling point range of 36°/20 mm Hg to 150°C/15 mm Hg.

A residue of 17 g remained in the flask. This residue was subjected to hydrolysis and the free perfluorocarboxylic acids were extracted with ethyl ether.

The aqueous phase was likewise hydrolyzed and was treated with benzene to remove the iodine. After separation of the benzene layer the perfluorocarboxylic acids were extracted from the aqueous phase with ether. 33 g (21.7 percent) of perfluorocarboxylic acid were obtained from the combined ether extracts.

By further treatment of the benzene solution as described in Example 1 33 g (71 percent of the theoretical amount relative to the initial telomers) of iodine could be recovered.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the production of perfluoroalkylcarbonyl fluorides and perfluoroalkyl carboxylic acids having the formula $$R_F(CF_2CF_2)_{n-1}CF_2COB$$

which comprises reacting a perfluoroalkyl iodide having the formula $$R_F(CF_2CF_2)_n I$$

in each of which formulae B is a hydroxyl or fluoro radical, $R_F$ is a lower perfluoroalkyl radical, and n is an integer from 1 to 7, the said reaction being performed by heating the perfluoroalkyl iodide with oleum and chlorine at a temperature between 50° and 120°C in the presence of a salt of a metal of Group IIB of the Periodic Table, the molecular ratio of the free sulfur trioxide in the oleum to the perfluoroalkyl iodide being between 2.5:1 and 10:1, and subsequently isolating the resulting perfluoroalkylcarbonyl fluoride from the reaction mixture or converting the perfluoroalkylcarbonyl fluoride to the corresponding perfluoroalkyl carboxylic acid by hydrolysis.

2. A process as defined in claim 1 in which the oleum and chlorine are each added gradually in small portions to a heated mixture of the perfluoroalkyl iodide and the salt of the metal.

3. The process of claim 1 wherein $Hg_2SO_4$, $HgSO_4$ or a mixture of these two compounds are employed as the metal salt.

4. The process of claim 1 wherein zinc sulfate is used as the metal salt.

5. The process of claim 1 wherein the metal salt is employed in an amount of 0.1 to 5 percent by weight relative to the amount of perfluoroalkyl iodide used as starting product.

6. The process of claim 1 wherein chlorine is introduced in the reaction in an amount of 5 to 25 percent by weight relative to the amount of perfluoroalkyl iodide used as starting product.

7. The process of claim 1 wherein the reaction is carried out with an amount of oleum to provide for a mol ratio of free $SO_3$ to perfluoroalkyl iodide between 3:1 and 8:1.

8. The process of claim 1 wherein in order to recover perfluorocarboxylic acid and iodine, the entire mass is subjected to hydrolysis after said reaction with oleum whereupon the iodine is extracted with benzene and the remaining aqueous solution is extracted with ethyl ether followed by recovery of the perfluorocarboxylic acid from the ether solution.

9. The process of claim 1 wherein the perfluoroalkyl group ($R_F$) is a perfluoromethyl, perfluoroethyl, perfluoropropyl or perfluoroisopropyl group.

10. The process of claim 1 wherein a mixture of perfluoroalkyl iodides with 6 to 12 carbon atoms is employed as starting product.

* * * * *